Oct. 19, 1954
C. H. HERRMANN
2,692,106
FISHING ROD HOLDER
Filed Oct. 30, 1951
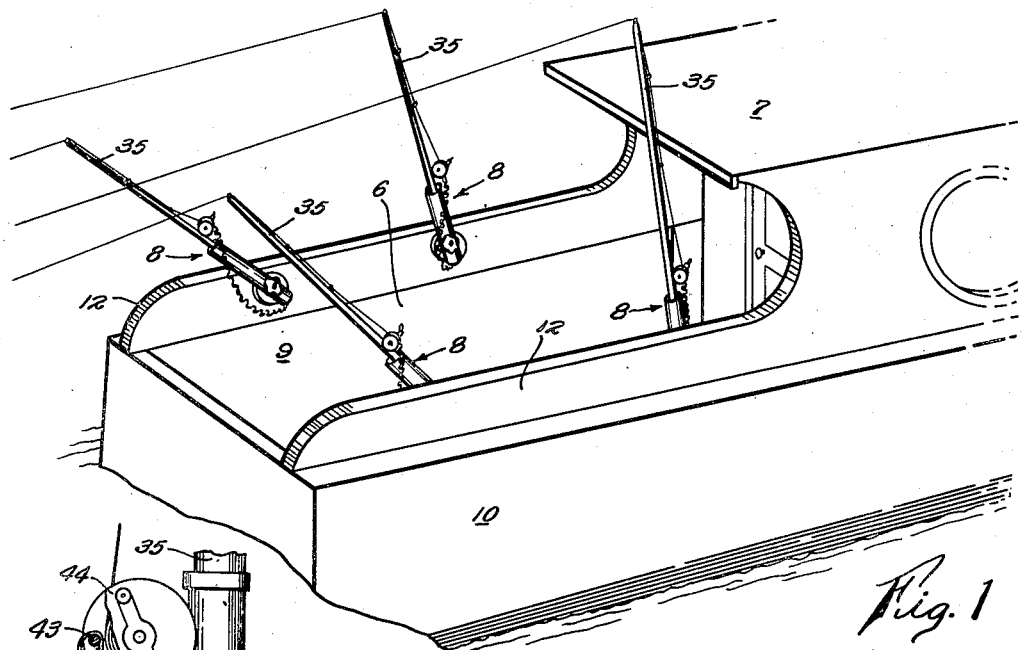
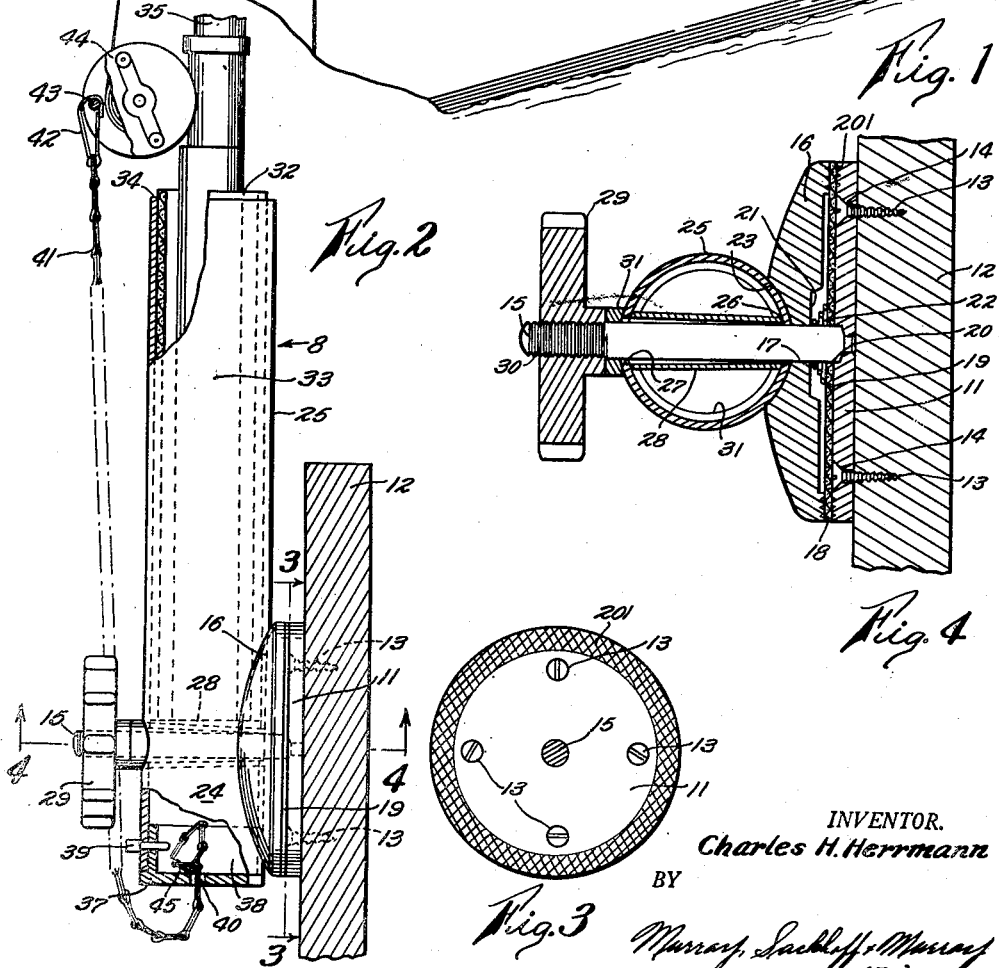
Fig. 1
Fig. 2
Fig. 3
Fig. 4
INVENTOR.
Charles H. Herrmann
BY
Murray, Sackhoff & Murray
ATT'YS Patented Oct. 19, 1954

2,692,106

UNITED STATES PATENT OFFICE 2,692,106

FISHING ROD HOLDER

Charles H. Herrmann, Cincinnati, Ohio

Application October 30, 1951, Serial No. 253,856

4 Claims. (Cl. 248—40)

The present invention relates to improvements in fishing rod holders and is particularly directed to a device adapted for attachment to a seagoing boat for the purpose of securely holding a fishing rod used in deep sea trolling, or the like.

An object of the invention is to provide a holder that is adapted to rotatably mount a fishing rod on an upstanding part of the boat for movement about a substantially horizontal axis and in a plane disposed longitudinally of the boat, said holder having means for clamping the holder in selected, inclined positions in order that a number of rods may be mounted by individual holders in longitudinally spaced apart positions thereby lessening the danger of entangling the fishing lines for the rods.

Another object of the invention is to provide a rotatable holder structure which affords protection of certain mounting screws and moving parts against corrosion by sea water.

A further object of the invention is to provide in a fishing rod holder, having the foregoing characteristics, a pivoted socket member and a novel tether associated with the member to prevent removal of a fishing pole from the member when it is in selected, inclined positions.

Another object of the invention is to provide a simplified but rugged fishing rod holder which has a strong and effective clamp for maintaining the holder in selected, upstanding positions.

Other objects and advantages of this invention will be more fully apparent from the following detailed description taken in conjunction with the accompanying drawing which is illustrative of the preferred form of my invention.

In the drawing:

Fig. 1 is a perspective view of the cockpit for a small fishing boat showing a number of my holders in operative positions thereon to mount a number of fishing rods.

Fig. 2 is an enlarged side elevational view of one of the holders shown in Fig. 1, parts being broken away and shown in central section.

Fig. 3 is a section taken on line 3—3 of Fig. 2.

Fig. 4 is an enlarged section taken on line 4—4 of Fig. 2.

Referring now in detail to the drawing a cockpit 6 of a small fishing boat 7 is shown in Fig. 1 as having a number of my fishing rod holders 8 mounted thereon. The holders are secured along an upstanding part of the boat such as the interior faces of the opposed side walls 9 and 10 forming the cockpit for the boat.

As shown in detail in Figs. 2-4 my fishing rod holder comprises a circular, planar boss 11 affixed to the upstanding side wall of the boat 7, particularly to the gunwale 12 therefor, by mounting means such as wood screws 13 which pass through a circular row of countersunk holes 14 formed in an intermediate circular portion of the boss. A pivot pin 15 is concentrically mounted on, and extends at right angles from the boss, and, as indicated in Figs. 1 and 2, said pivot pin is positioned by the boss to an upstanding part of the boat in a substantially horizontal position extending at right angles to the length of the boat.

A circular base plate 16 is rotatably mounted upon the pin for cooperative clamping action with the boss 15, and to this end the plate is provided with a central bore 17 for receiving the pin, and with a flat face 18 directed toward the outer face of the boss. The flat face 18 is preferably of limited extent and as shown in Fig. 3 the face takes the form of a circular rim formed around the periphery of the base plate. Interposed between the boss and the base plate is a friction disc 19 which has a central hole 20 for receiving the pin 15. As indicated in Fig. 3 the face 18 on the base plate 16 is scored, and the cooperating circular rim portion of the boss is scored at 201, to provide good clamping action between the base plate and boss when they are forced toward one another for gripping action with the friction disc. The base plate has a concentric inset portion 21 to provide clearance for an expansile, spiral spring 22 encircling the pin 15 and bearing at its inner end against an inner portion of the friction disc that is backed up by the boss and at its outer end against the base plate.

A lateral groove 23 is formed in the outer face of the base plate for receiving one end portion 24 of a tubular, socket member 25. The side wall portion on the short end 24 of the socket member is provided with a pair of opposed holes 26 and 27 of different diameters, the smaller hole having a diameter slightly larger than the outer diameter of the pin 15 and being located adjacent the base plate 16. An outwardly flared, reenforcing sleeve 28 is located within the tubular member in axial alignment with the diametrically opposed holes 26 and 27, said sleeve being sweated to the interior wall of said tubular member.

A hand wheel 29 is threaded to the exteriorly threaded end 30 of the pin 15, a washer 31 being interposed between the wheel and the reenforced portion of the tube around the pin, it being noted that an extremely fine thread is provided between the hand wheel and the pin and that the wheel itself has a large diameter so that a relatively great clamping force may be developed between the boss and the base plate when the wheel is manually turned down on the pin.

A rubber liner 32 is positioned within the long end 33 of the tube and extends between the flared sleeve 28 and the open end 34. The rubber liner is extended slightly beyond the open end of the tubular member whereby the sleeve functions to effectively prevent marring or damage to the handle portion 35 of a fishing rod 36 that is operatively disposed within the socket member. The opening in the short end 24 of the socket member is closed by a plug 37 (Fig. 2) said plug having a reduced end 38 for snug insertion into the end of the tube, the plug being held therein by means of a pin 39 insertable into aligned holes formed in the wall and the plug. A central opening 40 is formed in the plug for receiving the end of a flexible tether which preferably takes the form of a chain 41. The free end of the chain has a hook 42 secured thereto which is adapted to engage a cross bar 43 of a reel 44 that is secured to the fishing rod 36 in a well known manner. The effective length of the tether may be adjusted to suit a particular fishing pole in the holder by changing the position of the knot 45 made in that portion of the chain within the cap 39. The space between the cap and the flared sleeve may be utilized for storing the excess part of the chain not needed for the particular fishing rod positioned in the holder.

It will therefore be understood that my device has a rotatably mounted socket member adapted to receive the handle portion of a fishing rod, said member being so positioned that it may be swung about a horizontal axis and locked in a variety of selected, inclined positions, said device having a tethering means for precluding removal of the rod from the socket member but which may be readily released when removal of the rod from the holder is required, as, for instance, when it is determined, whilst trolling, that a fish has been hooked on the line of a particular rod. With reference to Fig. 1 it is to be noted that a number of my fishing devices may be mounted in a single cockpit of a fishing boat, without danger of line entanglement. To this end the fishing rods held in individual holders, are positioned by the holders at different inclinations, the rods toward the front of the boat being in relatively upright positions whilst the rods to the rear thereof are at greater inclinations thereby permitting the lines of said rods to remain clear of each other although the rods are disposed in longitudinally aligned positions with respect to the length of the boat.

Due to the coiled spring 22 between the boss and the base plate said parts will be axially moved apart when the hand wheel is loosened on the pin 15 thereby insuring separation of the parts prior to rotation of the parts to prevent mutilation of the friction disc which might otherwise occur if the disc were to stick to the rotating parts.

My device is also constructed to shield from corrosion the heads of the screws 13 and the scored, cooperating faces of the boss and base plate. The holder is normally in clamped position either in operative or in inoperative positions. When in clamped position the cooperating faces of the boss and the base plate are tightly pressed against the friction disc which is preferably made of a rubberized fabric. The scored surfaces are therefore buried in the disc and form a tight seal therewith to thereby preclude entrance of sea water into or between the faces of the boss and the base plate.

The diametrically opposed holes 26 and 27 formed in the tubular member on different diameters and the axially positioned outwardly flared, reenforcing sleeve 28 provide limited angular movement for the member on its mounting pin 15 to insure full surface engagement for the clamping faces of the boss 11 and the base plate 16 against the friction disc 19 even though the pin 15 may be slightly inclined with respect to the axis of the boss which might be caused by inaccuracy in manufacture or damage to the pin during use of the holder.

It is to be understood that the form of my invention, herewith shown and described, is to be taken as a preferred example of the same, and that various changes in size, shape, arrangement of the parts may be resorted to without departing from the spirit of my invention, or the scope of the appended claims.

What is claimed is:

1. A device adapted for holding fishing rods in selective, upstanding positions comprising a planar boss, mounting means for affixing the boss to an upstanding support, a pivot pin mounted on, and extending at right angles from the boss, a base plate mounted for rotation on the pin and having a lateral groove in its outer face, separable friction means interposed between the adjacent faces of the boss and the plate, a socket member for loosely receiving the handle portion of the rod, means for rotatably mounting the member on the pin, said member having one end portion engaged in the groove, and a hand wheel threaded to the free end of the pin and bearing against the socket member and adapted upon tightening to force the boss and plate together against the friction means.

2. A device for holding fishing rods according to claim 1 characterized by the fact that a flexible tether is affixed to the socket member and has a releasable catch on its free end for engagement with the rod.

3. A device particularly adapted for holding fishing rods in selective, upstanding positions comprising a planar boss, mounting means for affixing the boss to an upstanding support, a pivot pin mounted on, and extending at right angles from the boss, a base plate mounted for rotation on the pin and having a lateral groove in its outer face, a tubular socket member having in its end face adapted to loosely receive the handle portion of a fishing rod and the opposite end portion disposed in the lateral groove, a pair of diametrically aligned holes formed in said end portion of the member receiving the pin, a hand wheel threaded to the free end of the pin and bearing against the socket member, a plug fitted in the opening in said end portion of the socket member, removable means for positioning the plug in said end, a chain having a rod engaging hook secured to one of its ends and having its opposite end portion passing through an opening in the plug, and a chain length adjusting means associated with said end portion for anchoring the chain to the plug to provide a chain extension that will preclude axial withdrawal of the rod from the socket.

4. A fishing rod holder including a circular, planar boss, mounting means associated with the boss for affixing the boss to an upstanding support member, a pivot pin mounted concentrically on, and extending at right angles from the boss, a circular base plate having a central bore for receiving the pivot pin and having a flat surface facing the boss, said base plate having a lateral groove formed centrally in its outer face, a tubular socket member having one end disposed in said lateral groove, the side wall portion of said end being provided with a pair of opposed, aligned holes for receiving the pivot pin, said holes being formed on different diameters and the larger hole disposed in the outer portion of the tubular member, an outwardly flared, reenforcing sleeve located within the tubular socket member and in axial alignment with the holes, the outer free end of the pivot pin beyond the member being provided with external threads, and a hand wheel threaded to said end portion of the pin and adapted upon tightening to draw the base plate into clamping position with the boss, to fix the member in a rotatably selected position with respect to the boss.

References Cited in the file of this patent

UNITED STATES PATENTS

| Number | Name | Date |
|---|---|---|
| 593,018 | Hughes | Nov. 2, 1897 |
| 909,247 | Spry | Jan. 12, 1909 |
| 1,089,337 | Graham | Mar. 3, 1914 |
| 1,239,253 | Buck | Sept. 3, 1917 |
| 1,462,108 | Holywell | July 17, 1923 |
| 1,559,740 | Cardarella | Nov. 3, 1924 |
| 2,312,957 | Cannon | Mar. 2, 1943 |
| 2,491,008 | Lake | Dec. 13, 1949 |
| 2,518,908 | Korns | Aug. 15, 1950 |
| 2,632,616 | Heistand | Mar. 24, 1953 |

FOREIGN PATENTS

| Number | Country | Date |
|---|---|---|
| 11,555 | Great Britain | May 15, 1912 |
| 633,720 | Great Britain | Dec 19, 1949 |